(12) United States Patent
Morgenroth

(10) Patent No.: US 11,578,768 B2
(45) Date of Patent: Feb. 14, 2023

(54) FRICTION CLUTCH

(71) Applicant: LICOS TRUCKTEC GMBH, Markdorf (DE)

(72) Inventor: Joschua Morgenroth, Friedrichshafen (DE)

(73) Assignee: LICOS Trucktec GmbH, Markdorf (DE)

( * ) Notice: Subject to any disclaimer, the term of this patent is extended or adjusted under 35 U.S.C. 154(b) by 0 days.

(21) Appl. No.: 17/201,240

(22) Filed: Mar. 15, 2021

(65) Prior Publication Data
US 2021/0207664 A1 Jul. 8, 2021

Related U.S. Application Data

(63) Continuation of application No. PCT/EP2019/074951, filed on Sep. 18, 2019.

(30) Foreign Application Priority Data

Sep. 19, 2018 (DE) ...................... 10 2018 122 945.3

(51) Int. Cl.
*F16D 27/112* (2006.01)
*F16D 27/00* (2006.01)
*H01F 7/08* (2006.01)

(52) U.S. Cl.
CPC .......... *F16D 27/112* (2013.01); *F16D 27/004* (2013.01); *H01F 7/081* (2013.01); *H01F 2007/083* (2013.01)

(58) Field of Classification Search
CPC ............. F16D 2027/008; F16D 27/112; H01F 2007/083
See application file for complete search history.

(56) References Cited

U.S. PATENT DOCUMENTS

| 4,305,198 A | 12/1981 | Kanamaru et al. |
| 4,344,056 A | 8/1982 | Kroeger et al. |

(Continued)

FOREIGN PATENT DOCUMENTS

| CN | 101802430 A | 8/2010 |
| DE | 11 2013 004 953 T5 | 7/2015 |

OTHER PUBLICATIONS

German Search Report (Application No. 10 2018 122 945.3) dated Jul. 17, 2019.

(Continued)

*Primary Examiner* — Stacey A Fluhart
(74) *Attorney, Agent, or Firm* — Burr & Brown, PLLC

(57) ABSTRACT

A friction clutch having an electromagnet assembly including a coil and a magnet connected to the coil. When the coil is energised, a magnetic field is generated and passes through the magnet and a magnetisable conductive body adjacent to the magnet, such that a displaceable magnetisable armature portion can be brought from one position into another position. The coil has a plurality of outer portions each having an associated outer dimension of the outer portion. The magnet completely covers an outer portion of the coil by a magnet side. Two further outer portions of the coil are not covered by the magnet or are not covered by more than 20% of an outer dimension of the further outer portion, or wherein, in the case a single further outer portion covered by the magnet, the outer portion is not covered by more than 70%.

13 Claims, 3 Drawing Sheets

(56) References Cited

U.S. PATENT DOCUMENTS

| | | | | |
|---|---|---|---|---|
| 4,428,470 A | * | 1/1984 | Bennett | F16D 27/112 335/297 |
| 5,642,797 A | * | 7/1997 | Wall | F16D 27/14 192/84.961 |
| 5,735,375 A | * | 4/1998 | Booth | F16D 27/14 148/218 |
| 5,870,818 A | * | 2/1999 | Bisaga | H01F 41/0213 192/84.3 |
| 9,478,341 B2 | | 10/2016 | Qin et al. | |
| 2002/0066632 A1 | * | 6/2002 | Kristen | F16D 67/06 192/17 C |
| 2008/0060901 A1 | * | 3/2008 | Zhao | F16D 27/112 192/84.1 |
| 2008/0283352 A1 | | 11/2008 | Purvines | |

OTHER PUBLICATIONS

International Search Report and Written Opinion (Application No. PCT/EP2019/074951) dated Jan. 15, 2020.

English translation of the International Preliminary Report on Patentability (Chapter 1) dated Apr.1, 2021 (Application No. PCT/EP2019/074951).

Chinese Office Action (with English translation), Chinese Application No. 201980061089.3, dated Nov. 9, 2022 (16 pages).

\* cited by examiner

FRICTION CLUTCH

CROSS REFERENCE TO RELATED APPLICATIONS

This application is a continuation of International Application No. PCT/EP2019/074951 filed Sep. 18, 2019, which designated the United States, and claims the benefit under 35 USC § 119(a)-(d) of German Application No. 10 2018 122 945.3 filed Sep. 19, 2018, the entireties of which are incorporated herein by reference.

FIELD OF THE INVENTION

The present invention relates to a friction clutch.

BACKGROUND OF THE INVENTION

Friction clutches in vehicles having an internal combustion engine are known, for example, as part of a drive for an auxiliary unit, such as, for example, a water pump or a fan of a cooling system of the motor vehicle. Electromagnetically actuatable friction clutches are frequently installed for switching the auxiliary unit.

SUMMARY OF THE INVENTION

It is the object of the present invention to provide an improved electromagnetically actuatable friction clutch for a drive of an auxiliary unit of an internal combustion engine of a vehicle, which is improved from economic and technical perspectives, which is, in particular, of compact construction and which provides an optimized magnetic effect.

The present invention is based on a friction clutch for a drive of an auxiliary unit of an internal combustion engine of a vehicle, having an electromagnet assembly comprising a coil body having a coil and a magnet body connected to the coil body, wherein, when the coil is energized, a magnetic field having magnetic field lines can be generated, wherein the magnetic field lines pass through the magnet body and a magnetizable conductive body adjacent to the magnet body, such that a displaceable magnetizable armature portion can be brought from one position into another position, wherein the coil body has a plurality of outer portions, each having an associated outer dimension of the outer portion. As the main surface sides, the coil body preferably comprises an axial lower face, an upper face opposing the lower face, a radially external outer face and a radially internal inner face opposing the outer face, wherein the outer face and the inner face extend in each case between the lower face and the upper face.

The friction clutch which is constructed so as to be rotationally symmetrical relative to a shaft is configured, in particular, as friction face clutch and/or friction disk clutch, having the components of known friction face clutches. The armature portion is able to be brought, in particular, from a position which is separated from the conductive body into a position which is frictionally connected to the conductive body and back again into the separated position.

The coil body comprises the coil and a coil winding body which are preferably encapsulated by a plastics material and thus form a common component.

The magnet body and the conductive body are magnetizable and/or comprise a magnetizable material and/or consist of a magnetizable material, in particular, of a ferromagnetic material.

The essential idea of the present invention is that the magnet body completely covers an outer portion of the coil body by a magnet body side, preferably completely covers an axial side of the coil body, wherein two further outer portions of the coil body are not covered by the magnet body or are not covered by more than a value of 20 percent of one respective outer dimension of the further outer portion, or wherein, in the case of a single further outer portion covered by the magnet body, the outer portion is not covered by more than a value of 70 percent, wherein the conductive body covers the magnet body at opposite outer portions, in particular, over an area that is at least 50 percent of a cross-sectional area of the conductive body through which the magnetic field passes.

An outer dimension of an axial side of the coil body is, in particular, a radial width of the coil body and/or an outer dimension of a radial side of the coil body is an axial height of the coil body, relative to a shaft axis of the auxiliary unit passing through the friction clutch.

In the case of a single further outer portion covered by the magnet body, it is particularly preferred if the outer portion is not covered by more than a value of 60 percent, preferably not by more than a value of 50 percent, preferably not by more than a value of 40 percent or preferably not by more than a value of 30 percent.

By means of the friction clutch according to the present invention, a small constructional space is possible and/or a compact design may be achieved. In particular, preferably a relatively reduced radial width and/or an optimal geometry, in particular, an optimal coil geometry, is possible in the radial direction from a shaft on which the friction clutch may be arranged.

In particular, double wall assemblies, which are present in the known assemblies and which are formed by adjacent wall portions of the conductive body and the magnet body, may be entirely or partially avoided. This is advantageous for space reasons and regarding the weight and/or the material cost of the friction clutch. Preferably, the coil has a simple geometry, preferably a square or at least approximately square cross section.

With the same radial constructional space of known friction clutches, which have an electromagnet assembly with a magnet body completely enclosing the coil body on three sides in a U-shaped manner, and the friction clutch according to the invention, an approximately square coil geometry which additionally permits an improved magnetic flux may be implemented by the invention. It is also advantageously possible by means of the present invention that, with the same function and/or with the same magnetic flux, a smaller radial constructional space is required relative to the shaft axis compared to a known assembly. In the known assemblies, it is a drawback that a double wall and/or that two adjacent walls are present on either side of the coil body, the walls increasing the width of the assembly in the radial direction. In the known assemblies, a double wall is present in each case radially inwardly and radially outwardly. The double wall consists in each case of a first wall formed from a first leg of the U-shaped magnet body and a second wall formed from a second leg of the adjacent U-shaped conductive body. This leads to a greater overall dimension of the assembly in the radial direction compared with the friction clutch according to the present invention, in which a block-like magnet body is adjacent axially and/or below the coil body.

It is particularly preferred in this case that the magnet body side which completely covers the relevant outer portion of the coil body has the same dimension or virtually the same dimension in the covering direction as the covered outer portion. Relative to a shaft which is able to be assigned to the friction clutch, it is preferred if the radial width of the coil body preferably corresponds to the radial with of the magnet body. Accordingly, the covering magnet body side does not protrude or does not substantially protrude over the two edges of the covered outer portion of the coil body.

The magnet body sides are, in particular, and/or preferably, the sides of the magnet body which form an at least substantially planar outer face of the magnet body. Two adjacent and/or adjoining magnet body sides are accordingly oriented at an angle and/or at right-angles to one another. Opposing magnet body sides are separated from one another via two further magnet body sides and preferably oriented parallel to one another. A magnet body in a simple shape, for example, has a rectangular or square and/or at least approximately rectangular or square cross section.

The first outer portions extend over a first outer dimension of the coil body, for example a height, and the second outer portions extend over a second outer dimension of the coil body, for example a width.

The outer portions of the coil body are to be correspondingly understood, wherein the outer portions of the coil body in each case form a planar outer surface of the coil body. Preferably a coil body in a simple shape, for example, has a rectangular or square and/or at least approximately rectangular or square cross section.

During the operation of the clutch according to the present invention the magnet body and the coil body are arranged about a shaft, such as, for example, a shaft of the auxiliary unit to be driven. The magnet body and the coil body are preferably formed in each case as a closed annular shaped body, which in each case encloses the shaft externally in an annular manner, and wherein the magnet body and the coil body are axially adjacent relative to the shaft axis. A radial dimension and/or width of the magnet body and of the coil body relative to the shaft are preferably at least approximately identical. The annular bodies are preferably formed with a uniform cross-sectional shape over their entire annular extent.

The electromagnet assembly with the coil body and the magnet body are preferably located at least approximately completely in a recessed receiving region of the conductive body, which is preferably U-shaped in cross section. The receiving region of the conductive body is preferably open in the manner of a channel and/or on one side. The receiving region is defined, for example, by opposing walls and/or legs of the conductive body and a base of the conductive body which is present therebetween.

Preferably, except for the completely covered outer portion of the coil body, none of the further outer portions of the coil body is either partially or completely covered by the magnet body. Accordingly, none of the further outer portions is covered by the magnet body. In other words, in the case of a quadrangular cross section of the coil body, the upper face, the outer face and the inner face of the coil body are not covered by the magnet body. Thus, a particularly compact design may be achieved, in particular, in the radial direction from a shaft which is present and/or in the direction of a radial external dimension of the friction clutch.

Preferably, the side of the coil body remote from the base of the conductive body and/or the armature portion, such as, for example, a lower face of the coil body, is completely covered by the magnet body.

An advantage results by at least the outer portion of the coil body, which opposes the outer portion completely covered by the magnet body, not being covered by the magnet body.

The outer portion of the coil body which is completely free, such as, for example, the upper face, accordingly opposes the outer portion of the coil body which faces the magnet body. The free outer portion of the coil body is preferably present immediately adjacent and/or spaced apart from the base of the conductive body with relatively narrow air gap. Thus, the coil body and the magnet body may be accommodated in a compact manner in the recessed region of the conductive body. Advantageously, virtually the entire cavity of the recessed region of the conductive body may be filled up by the two bodies and/or the coil body and the magnet body which is electromagnetically effective.

It is also advantageous that the magnet body is configured to be adapted to the coil body such that just one of two opposing outer portions of the coil body and just one of the two further opposing outer portions of the coil body are present without being covered by the magnet body. The two relevant outer portions of the coil body located at an angle to one another are completely free of the magnet body. For a compact design the completely free sides may be moved directly onto and/or very close to opposing portions of the conductive body. The smallest gap dimensions may be implemented between the free outer portions of the coil body and the sides of the conductive body which is rotatable relative to the fixed coil body.

For example, relative to a shaft which is present, an axial outer portion of the coil body and/or the upper face and a radial outer portion of the coil body are completely uncovered by a magnet body side. Accordingly, in addition to the completely covered outer portion, in particular, a partially covered outer portion of the coil body or two covered outer portions of the coil body, for example, the inner face or outer face, are present. To this end, for example, the magnet body has an L-shape in cross section and/or an edge of the magnet body protruding at an angle, the partial covering being implemented thereby. The magnet body is, for example, L-shaped and/or angular in cross section with two magnet body legs located at an angle to one another.

A further modification of the present invention is produced by the magnet body having a substantially quadrangular cross section. This is advantageous in terms of production technology and from the perspective of the space required.

It is also advantageous that the friction clutch is configured for assembly on a shaft on which the conductive body or the armature portion is able to be received, wherein the shaft has a longitudinal axis which predetermines an axial direction of the friction clutch relative to the shaft and a radial direction of the friction clutch. The shaft is preferably a drive shaft of the auxiliary unit, such as, for example, a water pump and/or a fan wheel. The conductive body, which is preferably rotatably mounted via a rolling body bearing assembly, is preferably connected to a rotor, for example, a pulley, which may be driven so as to rotate concentrically relative to the shaft axis by means of the internal combustion engine, for example, via a belt. In the case of a closed friction clutch and the effective magnetic field, via the armature portion which is connected fixedly in terms of rotation to the shaft and which is moved toward the conductive body, and which is frictionally connectable thereto, a connection which is fixed in terms of rotation may be created between the rotor and the shaft such that, when the rotor rotates, the shaft of the auxiliary unit is rotated at a rotor speed and thus the auxiliary unit connected to the shaft is able to be driven.

It is also advantageous that in the radial direction of the friction clutch, an outer dimension of the magnet body side, which completely covers just the one outer portion of the coil body, at least substantially corresponds to an outer dimension of the completely covered outer portion of the coil body in the radial direction of the friction clutch. The outer dimension is accordingly to be understood as a radial width of the covering magnet body side which at least substantially corresponds to the radial width of the covered outer portion of the coil body. By matching the radial width of the coil body and the magnet body, and with the correspondingly slightly larger radial width of the recessed region of the conductive body adapted thereto, the recessed region may be optimally filled by the coil body and the magnet body, whereby this region is used in a manner which is electromagnetically optimal and/or effective.

It is also advantageous that opposing magnet body sides which extend in the axial direction of the friction clutch are separated in each case by an air gap from portions of the conductive body. Thus, it is possible for the conductive body to rotate freely relative to the positionally fixed magnet body in a space-saving manner.

According to an advantageous embodiment of the present invention, the magnet body is of layered construction. This permits a cost-effective provision of the magnet body. In particular, it is advantageous that the multi-part magnet body component may be assembled in one operation. Moreover, by varying the respective number and/or width of the layers, the size and/or the strength of the magnetic effect and thus the strength of the friction clutch may be influenced and/or determined. The layered construction preferably comprises a plurality of flat, thin layers made of a magnetizable sheet steel and/or a laminated core ring made of a plurality of laminated rings which are preferably identically shaped and which are fixedly connected together so as to be stacked in alignment with one another. The rings are able to be produced in a comparatively simple manner, for example, by a punching process or by laser cutting. Advantageously, a height of the magnet body may be designed to be variable by means of the layered construction, by the corresponding number of layers and/or rings being predetermined and/or used. It is also advantageous that, irrespective of the number of rings, the assembly thereof may be carried out using the same tool.

It is also advantageous that the magnet body comprises a fastening portion on a magnet body side which in the axial direction of the friction clutch faces away from the magnet body side which completely covers just the one outer portion of the coil body. In addition to the possibility of fastening the magnet body, the magnetic flux of the magnetic field lines may also be positively influenced by the fastening portion, which is possible by predetermining the design of the fastening portion. Thus, via a portion of the fastening portion which extends below an axial front face of a leg of the conductive body, magnetic field lines may enter from this portion into the front face of the leg via an air gap.

The fastening portion is preferably also of magnetizable and/or layered construction and/or constructed from corresponding layer elements and/or to be annular in the manner of the actual remaining magnet body, simply from radially wider rings, for example. The fastening portion serves for fastening the magnet body to a counter portion of the friction clutch by fastening means, such as, for example, screws. Since the coil body in turn is fixedly connected to the magnet body, the fixing of the coil body is also carried out via the fastening portion of the magnet body.

Preferably in the case of a layered construction of the magnet body, the fastening portion comprises a layer or a plurality of layers which are designed to be radially wider relative to the layers which form the base body of the magnet body. The radially wider region preferably covers an axial front face of the radially internal conductive body leg.

It is also advantageous that the magnet body has a layered structure, wherein the individual layers are fixed together mechanically and/or by a material connection. Preferably each layer consists of a magnetizable material and/or all of the layers are preferably identical, which provides advantages in terms of production technology. The connection of the layers may be carried out, for example, by clinching, riveting or by laminating, adhesive bonding or soldering.

Finally, it is advantageous that the magnet body and the coil body are configured to be adapted to one another, such that a cross-sectional area in the magnet body through which the magnetic field passes is at least 1.5 times as great as a cross-sectional area in the conductive body through which the magnetic field passes. In the case of a two-legged conductive body, with in each case a planar cross-sectional area in the leg axially to the shaft axis through which the magnetic field passes, it is advantageous if the cross-sectional area in the magnet body through which the magnetic flux passes is at least 1.5 times as great as the cross-sectional area of a conductive body leg through which the magnetic flux passes.

Thus, an optimized magnetic field effect may be achieved with a small space requirement. The plane of the cross-sectional area in the magnet body through which the magnetic field lines pass is preferably perpendicular to the plane of the cross-sectional area in the conductive body through which the magnetic field lines pass. In this case, it is assumed in an idealized situation that the magnetic field lines pass through the cross-sectional areas which are oriented perpendicular to the plane of the cross-sectional area.

The cross-sectional area of the two-legged conductive body through which the magnetic field lines pass comprises a cross-sectional area in one leg and a cross-sectional area in the other leg.

The relevant magnet body cross section represents an annular surface which is upright relative to the shaft and/or intersects the magnet body over the periphery relative to the shaft and/or in the peripheral direction of the shaft.

Advantageous assemblies comprising the friction clutch according to the present invention are friction clutches for auxiliary units for internal combustion engines, utility vehicles, water pumps and/or 2-speed water pump clutches with an additional eddy current drive principle for a further and/or lower rotational speed of the shaft of the auxiliary unit.

BRIEF DESCRIPTION OF THE DRAWINGS

Further features and advantages of the invention are described in more detail with reference to the exemplary embodiments according to the present invention shown schematically in the figures.

DETAILED DESCRIPTION OF THE INVENTION

Figure 1:
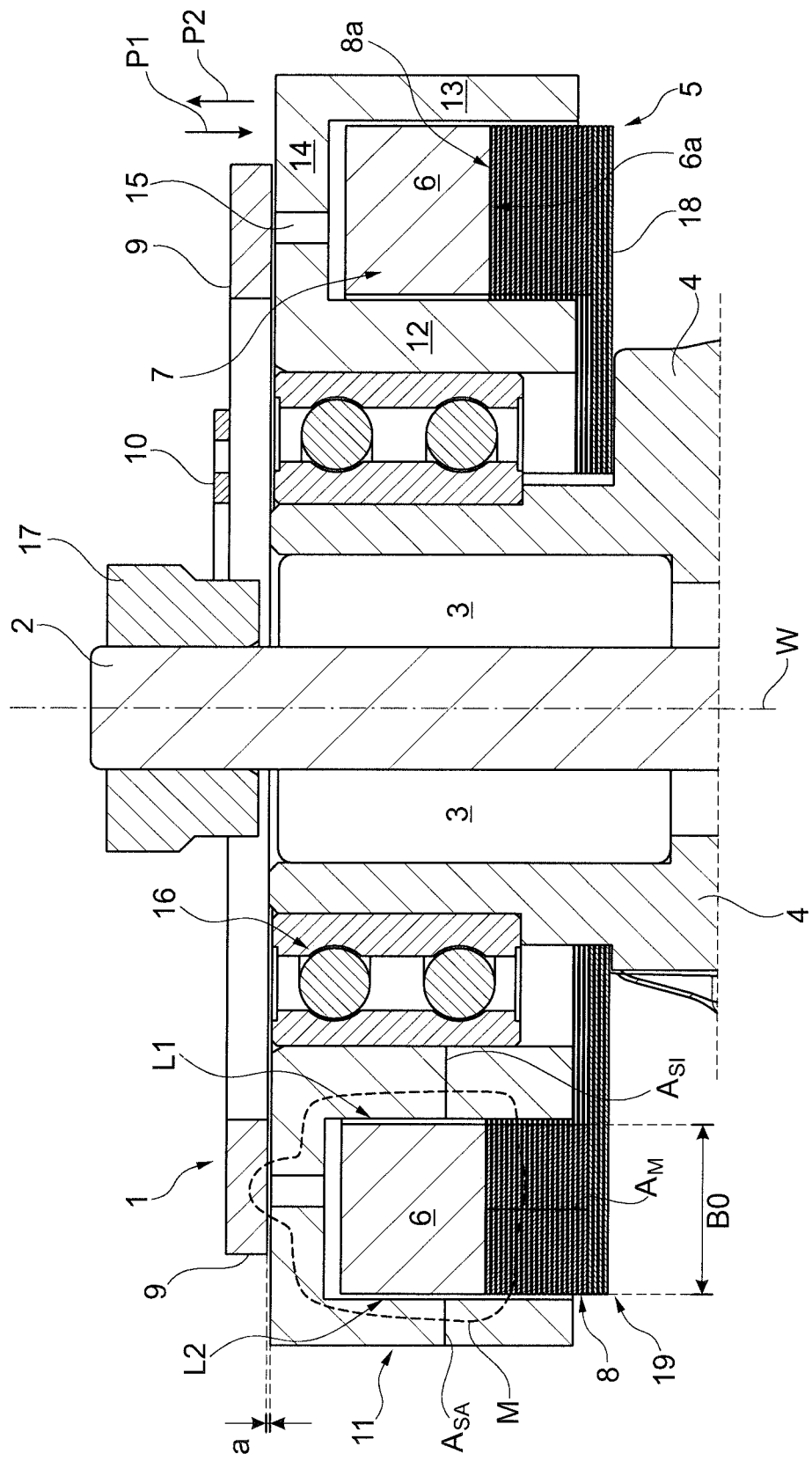
FIG. 1 shows a first embodiment of a friction clutch according to the present invention in section, wherein the friction clutch is received on a shaft of a partially shown water pump.

In some cases, the same reference numerals are used hereinafter for elements of the various embodiments which correspond to one another.

Figure 2:
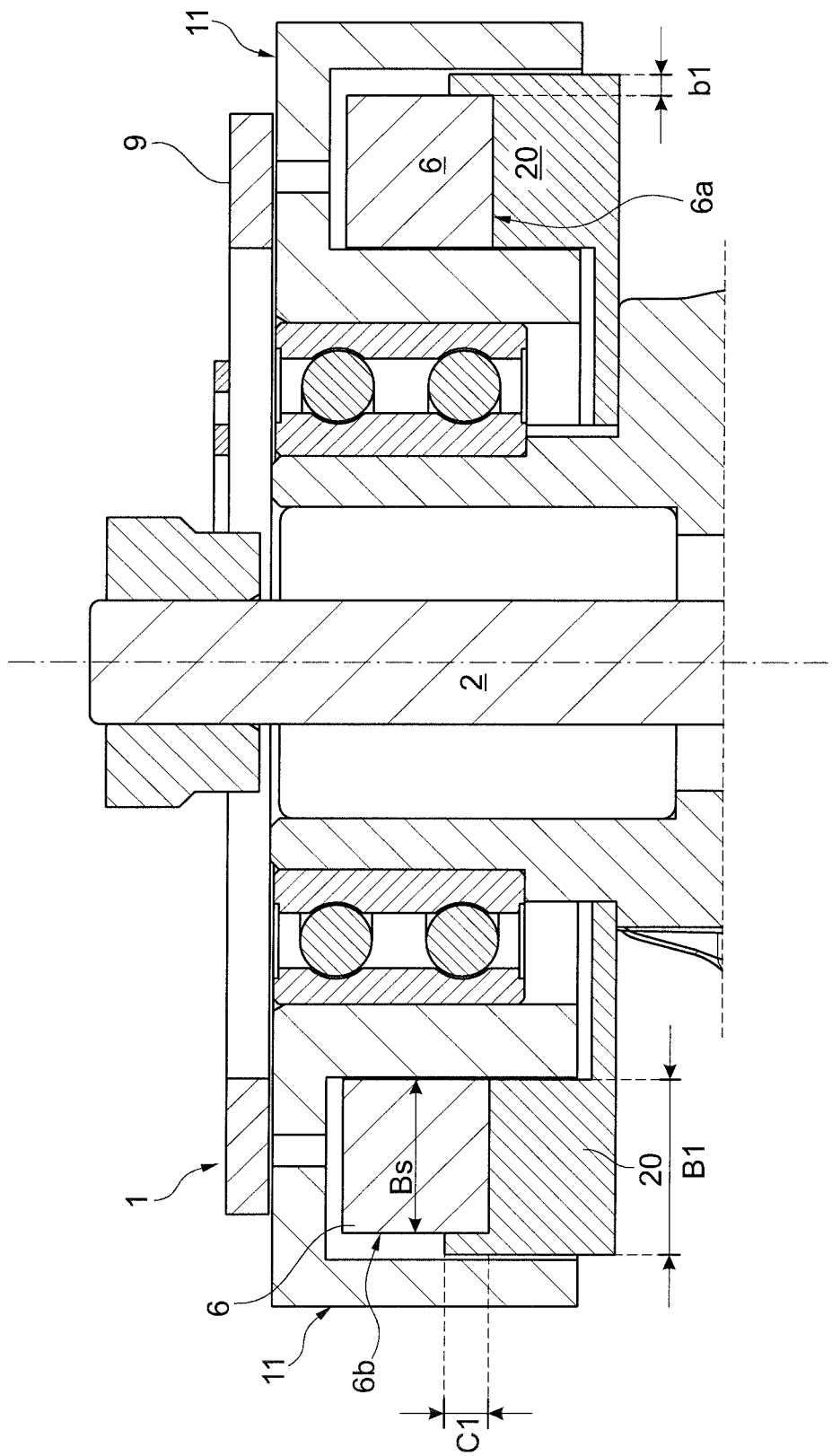
FIG. 2 shows an assembly according to FIG. 1 with a second embodiment of a friction clutch according to the present invention in section.
Figure 3:
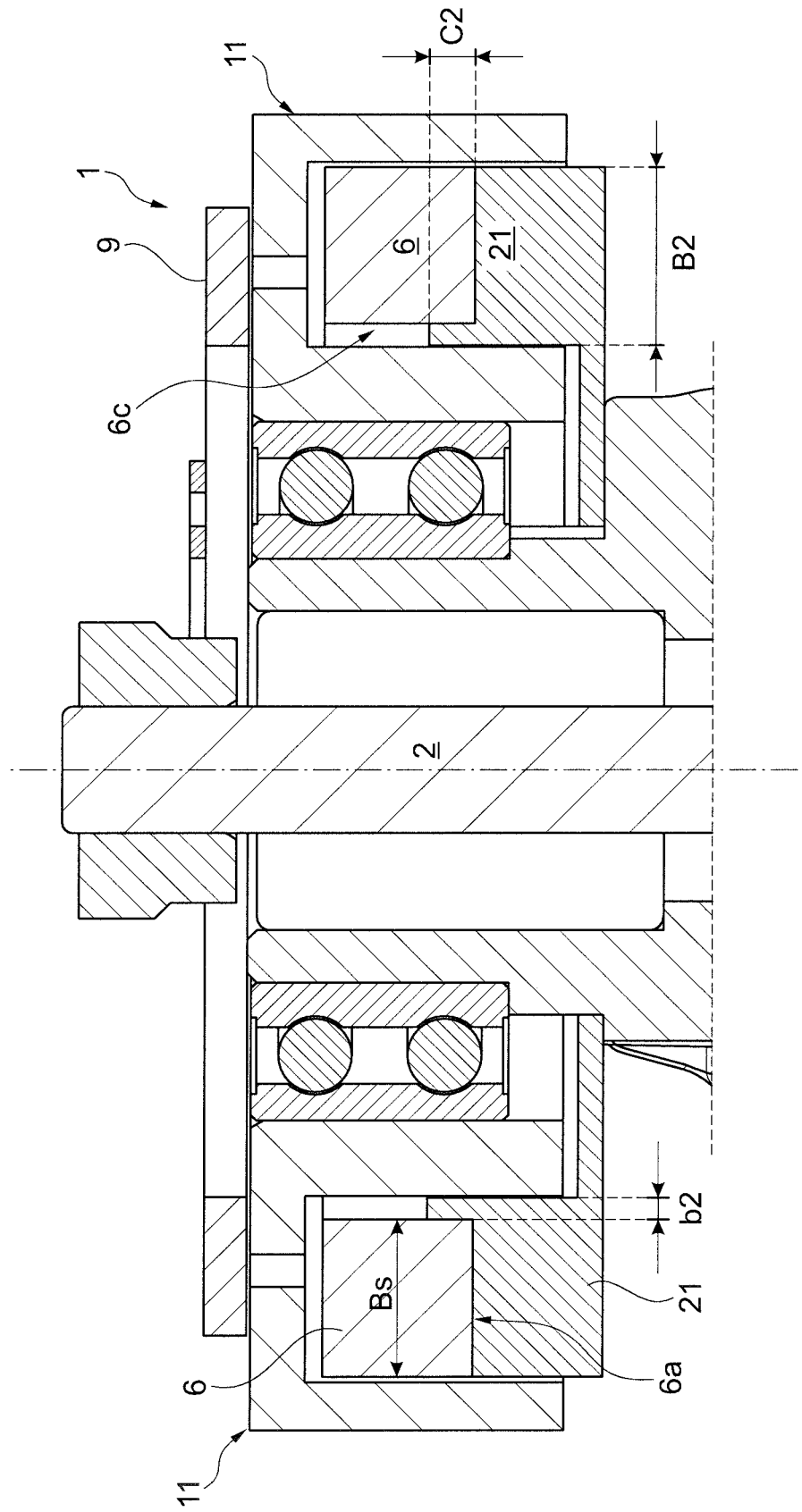
FIG. 3 shows an assembly according to FIG. 1 with a third embodiment of a friction clutch according to the present invention in section.

FIGS. 1 to 3 show in each case a state of an electromagnet assembly of the friction clutch which is not electrically energized and/or a non-electromagnetically switched state of the friction clutch according to the present invention.

The terms "axial" and "radial" refer hereinafter to a shaft with the shaft axis thereof, the friction clutch being received thereon.

FIG. 1 shows highly schematically a longitudinal section through a part of a drive for an auxiliary unit of an internal combustion engine (not shown) with a friction clutch 1 according to the present invention for the switchable drive of the auxiliary unit of the internal combustion engine of a vehicle.

The friction clutch 1 is used, for example, as a water pump clutch for a water pump of the cooling system of the vehicle.

To this end, the friction clutch 1 is received on a shaft passing centrally through the friction clutch 1 and/or on a pump shaft 2 of the water pump. In this case, the pump shaft 2 is rotatably mounted about its central shaft axis W via a pump shaft bearing 3, not shown in more detail, on a fixed portion 4 of the water pump.

The friction clutch 1 has an electromagnet assembly 5 comprising a coil body 6 with a coil 7 and a magnetizable magnet body 8 connected to the coil body 6.

Moreover, a magnetically conductive, ferromagnetic and/or magnetizable armature portion 9 of the friction clutch 1 is received on the pump shaft 2. The armature portion 9 is connected fixedly in terms of rotation to the pump shaft 2 via a spring arm 10 fixed to a flange 17. The armature portion 9 is able to be displaced approximately elastically in the axial direction P1 due to the elastically deformable spring arm 10, from its initial position shown in FIG. 1 if no magnetic field is generated by the electromagnet assembly 5 when the friction clutch 1 is switched on and/or is able to be restored in the direction P2 toward the pump shaft 2 when the switched state of the friction clutch 1 is released. In the unswitched state of the friction clutch 1 according to FIG. 1 and/or when the coil 7 is not energized and no resulting magnetic field is present, the armature portion 9 is axially spaced apart from a conductive body 11 of the friction clutch 1 via an air gap having a gap dimension a (see FIG. 1). The magnetizable conductive body 11 is U-shaped in cross section and/or axial section and comprises an axially extending radially internal leg 12, an axially extending radially external leg 13 opposing the first leg 12 and a base 14 connecting the two legs 12, 13 with a slotted recess 15 which is interrupted over the periphery relative to the shaft axis W.

The conductive body 11 is rotatably mounted with the radially internal side of the leg 12 via a rolling body bearing 16 on the fixed portion 4 of the water pump so as to be rotatable relative to the shaft axis W and/or relative to the pump shaft 2.

Moreover, the conductive body 11 is connected to a rotatably driven rotor, not shown, of the internal combustion engine so that during operation of the internal combustion engine the conductive body 11 is permanently and/or always rotated therewith.

The armature portion 9 with a flat planar lower face and the conductive body 11 with the flat upper face of the base 14 thereof are axially adjacent and only separated from one another in the millimeter range by the air gap, having the gap dimension a, when the electromagnet assembly is not switched on. In this state, the pump shaft 2 is not driven via the rotor and/or the conductive body and is at a standstill when no other drive acts in a propulsive manner on the pump shaft 2, such as for example an eddy current drive (not shown), when the friction clutch 1 is part of a 2-speed water pump clutch. For generating a reduced cool air flow and/or for a relatively low cooling action, for example, a fan wheel of a fan of the auxiliary unit may be attached to the flange 17 which is positioned fixedly in terms of rotation on the pump shaft 2. The spring arm 10 is fixedly connected to the flange 17.

During operation of the internal combustion engine when the electromagnet assembly 5 is energized and/or the coil 7 is electrically energized, the magnetizable armature portion 9 is displaced axially in the direction P1 via the gap dimension a by the magnetic field effect of the electromagnet assembly 5 and frictionally connected to the relevant axial upper face of the base 14. In this case, the pump shaft 2 rotates at the same rotational speed as the rotor and/or at the rotational speed of the conductive body 11 connected to the rotor.

For this state an individual highly schematically shown magnetic field line M of the relevant magnetic field is indicated on the left-hand side in FIG. 1 in dashed lines, wherein the armature portion 9 is not displaced in the direction P1 and/or is not shown in a frictional connection with the base 14, as is the case, however, in the effective magnetic field which may be created by the electromagnet assembly 5.

Moreover, the friction clutch 1 comprises a fastening portion 18 for fastening the magnet body 8 and the coil body 6 which is connected, for example, screwed, to the magnet body 8. A plug, not shown, for electrical contact from the outside and/or for temporarily supplying power to the coil 7 in a controlled manner may be advantageously integrated in the fastening portion 18 as an element which may be releasably attached thereto.

The fastening portion 18 is connected to the magnet body 8 and/or is part of the magnet body 8 and extends with a portion radially internally as far as the fixed portion 4 of the water pump, the fastening portion 18 being preferably releasably screwed thereto, for example.

Apart from the rolling bodies of the rolling body bearing 16, or optionally of the fixed portion 4, and the spring arm 10, all of the elements of the assembly according to FIG. 1 are of annular design and are components arranged in a closed manner about the pump shaft 2.

Advantageously, the magnet body 8 and/or the fastening portion 18 has a layered structure 19 and/or the magnet body 8 and/or the fastening portion 18 are layered and/or made from a plurality of layer elements connected together, such as magnetizable ferromagnetic laminated rings and/or are designed as a layered body.

Preferably only one outer portion 6a, for example, an axial lower face, of the coil body 6 is completely covered by the magnet body 8 and/or by a magnet body side 8a, in this case a magnet body upper face. Accordingly, the outer portion 6a remote from the base 14 and/or the lower face of the coil body 6 is exactly covered completely by the magnet body side 8a. The magnet body 8 does not protrude either radially inwardly or radially outwardly over the coil body 6.

In other words, the radial width of the coil body 6 and of the magnet body 8 are at least approximately identical, which is shown by the width B0.

Thus, the magnet body 8 does not cover the coil body 6 in the axial direction, either on a radial inner face of the coil body extending axially or on a radial outer face of the coil body extending axially.

The coil body 6 preferably has an at least approximately square cross-sectional area, in relation to the radial section relative to the shaft axis W according to FIGS. 1-3.

Moreover, an internal narrow peripheral air gap L1 which is closed over the periphery and an external narrow air gap L2 which is closed over the periphery are present between the conductive body 11 and/or the respective legs 12 and 13, on the one hand, and the electromagnet assembly 5 with the coil body 6 and the magnet body 8, on the other hand, so that the conductive body 11 is rotatable about the shaft axis W and/or relative to the fixed electrical assembly 5.

Accordingly, for the relative movement between the conductive body 11 and the electromagnet assembly 5, an axial air gap is formed between the coil body 6 and the base 14. The magnetic flux does not pass through this air gap.

In FIG. 1, a cross-sectional area in the magnet body 8 through which the magnetic flux passes perpendicularly is indicated by the cutting line $A_M$ of the cross-sectional area which is generated over the periphery and/or in an annular manner relative to the shaft axis W.

The cross-sectional area in the inner leg 12 of the conductive body 11 through which the magnetic flux passes perpendicularly is indicated by the cutting line $A_{SI}$ which is formed by the cross-sectional area and which is also generated over the periphery relative to the shaft axis W, wherein the cross-sectional area through which the magnetic flux passes in the magnet body 8 is perpendicular to the cross-sectional area in the inner leg 12 through which the magnetic flux passes.

Accordingly, the cross-sectional area in the outer leg 13 of the conductive body 11 through which the magnetic flux passes is indicated by the cutting line $A_{SA}$ which is formed by the cross-sectional area and which is also generated over the periphery relative to the shaft axis W, wherein the cross-sectional area through which the magnetic flux passes in the magnet body 8 is perpendicular to the cross-sectional area in the outer leg 12 through which the magnetic flux passes.

The cross-sectional area according to $A_M$ is preferably at least 1.5 times greater than the cross-sectional area according to $A_{SI}$. The cross-sectional area according to $A_M$ is preferably at least 1.5 times greater than the cross-sectional area according to $A_{SA}$.

The exemplary embodiments of the present invention according to FIG. 2 and FIG. 3 differ from the exemplary embodiment according to FIG. 1 solely in that the magnet body 8 is replaced by a different magnet body. Moreover, in FIG. 2 and FIG. 3, the layered structure of the respective magnet body 20 and/or 21 with the fastening portion is not illustrated.

According to FIG. 2, a magnet body 20 is adapted to the coil body 6 such that the magnet body 20 completely covers a lower face 6a of the coil body 6 and protrudes radially outwardly over the radially external edge of the coil body 6 by a radial dimension b1. Moreover, in the axial direction the magnet body 20 partially covers the axial outer face 6b of the coil body 6 and/or upwardly by an axial dimension c1, wherein in this case c1 makes up circa 25 to 30 percent of the entire axial extent of the coil body 6 in the axial direction.

A total radial width B1 which is predetermined by the coil body 6 and the magnet body 20 is increased solely by the dimension b1 relative to a radial width $B_S$ of the coil body 6.

According to FIG. 3, a magnet body 21 is adapted to the coil body 6 such that the magnet body 21 completely covers a lower face 6a of the coil body 6 and protrudes radially inwardly over the radially internal edge of the coil body 6 by a radial dimension b2. Moreover, in the axial direction the magnet body 21 partially covers the axial inner face 6c of the coil body 6 and/or upwardly by an axial dimension c2, wherein in this case c2 makes up circa 25 to 30 percent of the entire axial extent of the coil body 6 in the axial direction.

A total radial width B2 which is predetermined by the coil body 6 and the magnet body 21 is increased solely by the amount b2 relative to a radial width $B_S$ of the coil body 6.

A further embodiment, not shown, represents a combination of the assemblies of FIG. 2 and FIG. 3, according to which the magnet body completely covers a lower face of the coil body and also protrudes both radially inwardly and radially outwardly on the lower face of the coil body. The respective axially extending inner face and axially extending outer face of the coil body is additionally covered in each case over a partial axial height from below by the magnet body, thus in each case by a maximum value of 20 percent of the axial dimension and/or height of the respective outer face and/or inner face of the coil body.

LIST OF REFERENCE NUMERALS

1 Friction clutch
2 Pump shaft
3 Pump shaft bearing
4 Fixed portion
5 Electromagnet assembly
6 Coil body
6a Outer portion
6b Outer face
6c Inner face
7 Coil
8 Magnet body
8a Magnet body side
9 Armature portion
10 Spring arm
11 Conductive body
12 Leg
13 Leg
14 Base
15 Recess
16 Rolling body bearing
17 Flange
18 Fastening portion
19 Layered structure
20 Magnet body
21 Magnet body

The invention claimed is:

1. A friction clutch for a drive of an auxiliary unit of an internal combustion engine of a vehicle, having an electromagnet assembly comprising a coil body having a coil and a magnet body connected to the coil body, wherein when the coil is energized, a magnetic field having magnetic field lines is generated, wherein the magnetic field lines pass through the magnet body and a magnetizable conductive body adjacent to the magnet body, such that a displaceable magnetizable armature portion can be brought from one position into another position, wherein the coil body has two axially opposed side surfaces and two radially opposed side surfaces, with the coil therebetween, each being of an annular design and having an associated dimension of the coil body, wherein the magnet body completely covers one of the two axially opposed side surfaces of the coil body that is directly adjacent to the magnet body, wherein one of (i) the two radially opposed side surfaces of the coil body are not covered by the magnet body, (ii) the two radially opposed side surfaces of the coil body are not covered by the magnet body by more than a value of 20 percent of an axial dimension of the two radially opposed side surfaces of the coil body, or (iii) one of the two radially opposed side surfaces is covered by the magnet body by not more than an axial dimension value of 70 percent of the one of the two radially opposed side surfaces, wherein axially extending annular legs, which extend from a base, of the conductive body cover opposite radial portions of the magnet body to form a cross-sectional area in an axial direction of the magnet body and in a direction perpendicular to the axial direction in the axially extending annular legs of the conductive body through which the magnetic field passes.

2. The friction clutch as claimed in claim 1, wherein only the one of the two axially opposed side surfaces of the coil body that is directly adjacent to the magnet body is completely covered by the magnet body.

3. The friction clutch as claimed in claim 1, wherein at least the other of the two axially opposed side surfaces of the coil body which opposes the one of the two axially opposed side surfaces that is completely covered by the magnet body is not covered by the magnet body.

4. The friction clutch as claimed in claim 1, wherein the magnet body is configured to be adapted to the coil body such that just one of the two axially opposed side surfaces of the coil body and just one of the two radially opposed side surfaces of the coil body are present without being covered by the magnet body.

5. The friction clutch as claimed in claim 1, wherein the magnet body has a substantially quadrangular cross section.

6. The friction clutch as claimed in claim 1, wherein the friction clutch is configured for assembly on a shaft on which the conductive body or the armature portion is received, wherein the shaft has a longitudinal axis which predetermines an axial direction of the friction clutch relative to the shaft and a radial direction of the friction clutch.

7. The friction clutch as claimed in claim 1, wherein in a radial direction of the friction clutch, an outermost edge of the magnet body, which completely covers just the one of the two axially opposed side surfaces of the coil body, at least substantially corresponds to an outermost edge of the completely covered just one of the two axially opposed side surfaces of the coil body in the radial direction of the friction clutch.

8. The friction clutch as claimed in claim 1, wherein the opposite radial portions of the magnet body, which extend in an axial direction of the friction clutch, are separated in each case by an air gap from portions of the conductive body.

9. The friction clutch as claimed in claim 1, wherein the magnet body is of layered construction.

10. The friction clutch as claimed in claim 1, wherein the magnet body comprises a fastening surface dace on a magnet body side which in an axial direction of the friction clutch faces away from a side of the magnet body which completely covers just the one of the two axially opposed side surfaces of the coil body.

11. The friction clutch as claimed in claim 1, wherein the magnet body has a layered structure, wherein the individual layers are fixed together mechanically and/or by a material connection.

12. The friction clutch as claimed in claim 1, wherein the magnet body and the coil body are configured to be adapted to one another, such that a cross-sectional area in the axial direction of the magnet body through which the magnetic field passes is at least 1.5 times as great as a cross-sectional area in the direction perpendicular to the axial direction in one of the axially extending annular legs of the conductive body through which the magnetic field passes.

13. The friction clutch as claimed in claim 1, wherein the axially extending annular legs of the conductive body cover the opposite radial portions of the magnet body over an area in the axial direction of the magnet body that is at least 50 percent of a cross-sectional area in the direction perpendicular to me axial direction in the axially extending annular legs of the conductive body through which the magnetic field passes.

* * * * *